US009157982B2

(12) United States Patent
Lavery (10) Patent No.: US 9,157,982 B2
(45) Date of Patent: Oct. 13, 2015

(54) ULTRASONIC LOCATIONING SYSTEM USING REGIONAL ADDRESSING WITH ULTRASONIC TONES

(75) Inventor: Richard J. Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 462 days.

(21) Appl. No.: 13/572,839

(22) Filed: Aug. 13, 2012

(65) Prior Publication Data

US 2014/0043943 A1 Feb. 13, 2014

(51) Int. Cl.
*G01S 3/80* (2006.01)
*G01S 1/74* (2006.01)
*G01S 5/18* (2006.01)
*H01Q 1/00* (2006.01)
*H01Q 1/22* (2006.01)
*H01Q 7/00* (2006.01)
*H01Q 9/30* (2006.01)
*H01Q 21/20* (2006.01)
*H01Q 21/24* (2006.01)
*H01Q 5/40* (2015.01)
*H01Q 5/42* (2015.01)

(52) U.S. Cl.
CPC ... *G01S 1/74* (2013.01); *G01S 5/18* (2013.01); *H01Q 1/007* (2013.01); *H01Q 1/2216* (2013.01); *H01Q 1/2291* (2013.01); *H01Q 5/40* (2015.01); *H01Q 5/42* (2015.01); *H01Q 7/00* (2013.01); *H01Q 9/30* (2013.01); *H01Q 21/205* (2013.01); *H01Q 21/24* (2013.01)

(58) Field of Classification Search
CPC ............. G01S 1/74; G01S 5/18; H01Q 1/007; H01Q 1/2291; H01Q 5/0075; H01Q 9/30; H01Q 21/24; H01Q 1/2216; H01Q 5/0072; H01Q 7/00; H01Q 21/205
USPC .................................................... 367/118, 13
See application file for complete search history.

(56) References Cited

U.S. PATENT DOCUMENTS

| 5,150,336 | A | * | 9/1992 | Sullivan et al. ............... 367/103 |
| 5,977,913 | A | | 11/1999 | Christ |
| 7,400,594 | B2 | | 7/2008 | Pereira et al. |
| 7,406,001 | B1 | * | 7/2008 | Dzikowicz .................... 367/138 |
| 7,535,796 | B2 | | 5/2009 | Holm et al. |
| 7,796,471 | B2 | | 9/2010 | Guigne et al. |

(Continued)

FOREIGN PATENT DOCUMENTS

| CN | 102413425 | * | 4/2012 |
| CN | 102413425 A | | 4/2012 |

(Continued)

OTHER PUBLICATIONS

Machine translation of CN 102413425.*
Translation of CN102413425.*

(Continued)

*Primary Examiner* — Daniel Pihulic (57) ABSTRACT

An ultrasonic locationing system includes an emitter operable to emit at least two ultrasonic frequency tones sequentially in one ultrasonic burst. These tones, which may contain multiple frequency components, define a unique regional address. A mobile device with a microphone is operable to receive the ultrasonic burst and have a processor determine the sequential tones. A location of the device can be found from a table of predefined tones assigned to known regional addresses.

16 Claims, 6 Drawing Sheets

(56) References Cited

U.S. PATENT DOCUMENTS

| | | |
|---|---|---|
| 7,966,008 B2 | 6/2011 | Graves et al. |
| 2011/0028160 A1 | 2/2011 | Roeding et al. |
| 2011/0029370 A1 | 2/2011 | Roeding et al. |
| 2013/0053053 A1* | 2/2013 | Agarwal et al. ............... 367/118 |
| 2013/0083631 A1* | 4/2013 | Harrell et al. ................. 367/127 |
| 2013/0279295 A1* | 10/2013 | Calvarese et al. ............ 367/100 |
| 2013/0279297 A1* | 10/2013 | Wulff et al. .................. 367/127 |
| 2013/0329525 A1* | 12/2013 | Lavery et al. ................ 367/127 |
| 2014/0043943 A1* | 2/2014 | Lavery ......................... 367/118 |

FOREIGN PATENT DOCUMENTS

| | | |
|---|---|---|
| WO | 2005121830 A1 | 12/2005 |
| WO | 2008152170 A2 | 12/2008 |
| WO | 2011117739 | 9/2011 |

OTHER PUBLICATIONS

International Search Report and Written Opinion for counterpart International Patent Application No. PCT/US2013/053229 mailed Oct. 25, 2013.

* cited by examiner

ULTRASONIC LOCATIONING SYSTEM USING REGIONAL ADDRESSING WITH ULTRASONIC TONES

FIELD OF THE DISCLOSURE

The present disclosure relates generally to an ultrasonic locationing system, and more particularly to an ultrasonic locationing system using regional addressing with ultrasonic tones.

BACKGROUND

An ultrasonic receiver can be used to determine a location with reference to an ultrasonic emitter, such as locating a mobile device having an ultrasonic emitter and being present within a retail, factory, warehouse, or other indoor environment, for example. The ultrasonic emitter can transmit ultrasonic energy in a short burst which can be received by an ultrasonic transducer (microphone) in the ultrasonic receiver, thereby establishing at least the presence of the device within the environment. However, this requires that the mobile device have an installed ultrasonic emitter, which adds cost.

Further, the use of several ultrasonic microphones distributed within the environment can also be used to provide not only the presence but a specific location of a particular device using techniques known in the art such as triangulation, trilateration, and the like, as have been used in radio frequency locationing systems. However, this still requires that the mobile device have an installed ultrasonic emitter, which adds cost.

Accordingly, there is a need for a technique to locate a user's smart phone in an indoor environment without modifying the phone hardware and without requiring the user to carry an additional device for locationing purposes. It would also be beneficial if this technique did not require significant or complicated infrastructure changes and maintenance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to locate a user's smart phone in an indoor environment without modifying the phone hardware and without requiring the user to carry an additional device for locationing purposes. The present invention also provides this technique without significant or complicated infrastructure changes and maintenance.

The device to be locationed can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a device. Each device comprises a processor that can be further coupled to a keypad, a speaker, a microphone, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Figure 1:
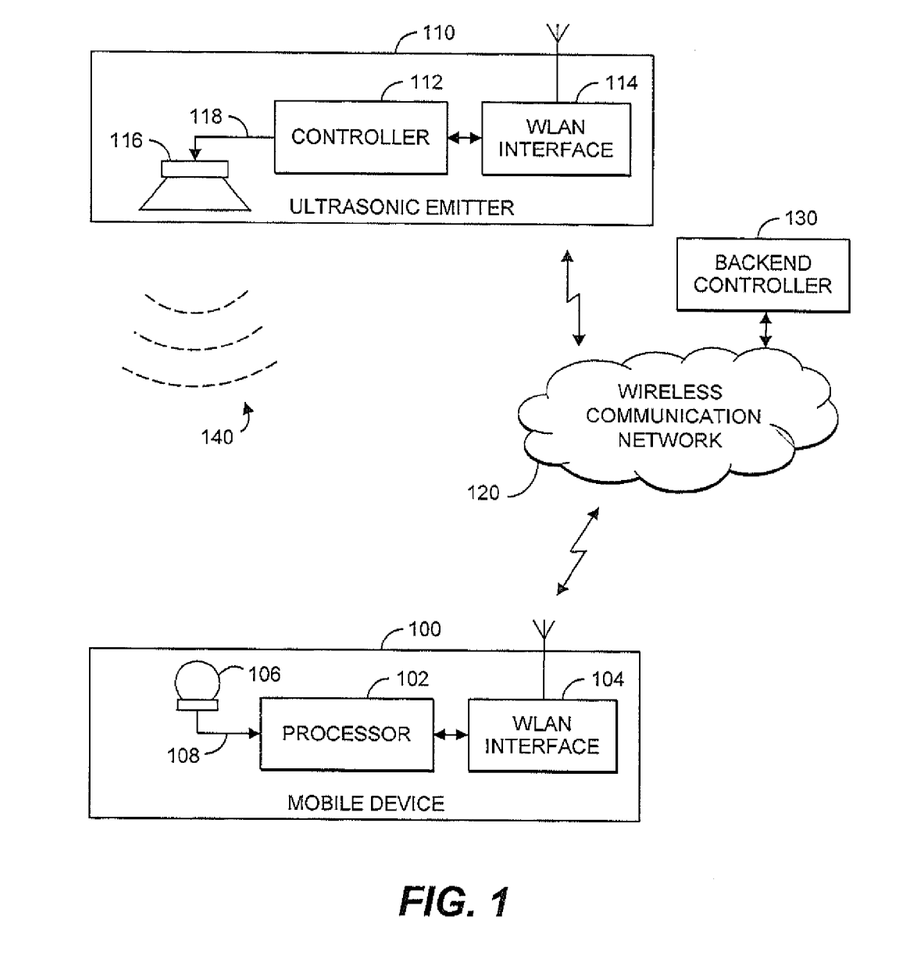
FIG. 1 is a simplified block diagram of an ultrasonic locationing system, in accordance with the present invention.

FIG. 1 is a block diagram of an ultrasonic locationing system, in accordance with the present invention. One or more ultrasonic transponders such as a piezoelectric speaker or emitter 116 can be implemented within the environment. The emitter can send a short burst of ultrasonic sound (e.g.

140) within the environment. The mobile device 100 can include a digital signal processor 102 to process the ultrasonic signal 140 received by a transponder such as a microphone 106, and specifically the frequency components of the signal 140 from ultrasonic emitter 116 in accordance with the present invention.

The microphone 116 provides electrical signals 108 to receiver circuitry including a signal processor 102. It is envisioned that the mobile device will have existing audio circuitry operable up to 44.1 kHz, i.e. the typically utilized Nyquist frequency for commercial audio devices, which relates to a 22.05 kHz usable upper frequency limit for processing audio signals. It is envisioned that the mobile device receiver circuitry is implemented in the digital domain, in a digital signal processor 102, for example. It should be recognized that other components, including a controller, amplifiers, analog-to-digital converters (i.e. digitizers), digital filters, and the like, are not shown for the sake of simplicity of the drawings. For example, the microphone signals can amplified in an audio amplifier and digitized for the signal processor 102.

The processor 102 can also be coupled to a controller (not shown) and wireless local area network interface 104 for wireless communication with other devices in the communication network 120. Alternatively, the mobile device 100 could be connected to the communication network 120 through a wired interface connection (not shown), such as an Ethernet interface connection. The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

In accordance with the present invention, the controller 112 of the ultrasonic emitter 110 provides the emitter 116 with at least two sequential frequency tones 118 to emit in one ultrasonic burst 140, with the tones comprising at least one symbol. The tones are different frequencies in the frequency range of about 20-22 kHz to enable the existing mobile device audio processor analyze the burst in the frequency domain to detect the different tones. Alternatively, the tones can be mixed to be emitted simultaneously. The 20-22 kHz range has been chosen such that the existing audio circuitry of the mobile device will be able to detect the ultrasonic tones without any users hearing the tones. In addition, it is envisioned that there is little audio noise in the range of 20-22 kHz to interference with the ultrasonic tones. An emitter is configured to have usable output across the 20-22 kHz frequency range. Alternatively, the controller can drive two emitters, one at each frequency tone. In addition, the emitter is configured to broadcast the burst over a limited coverage area or region. For example, it is envisioned that the emitter is affixed to a ceiling of an indoor environment, with the emitter oriented to emit a downward burst towards a floor of the environment, such that the burst from an emitter is focused to cover only a limited, defined floor space or region of the environment, as will be detailed below.

Figure 2:
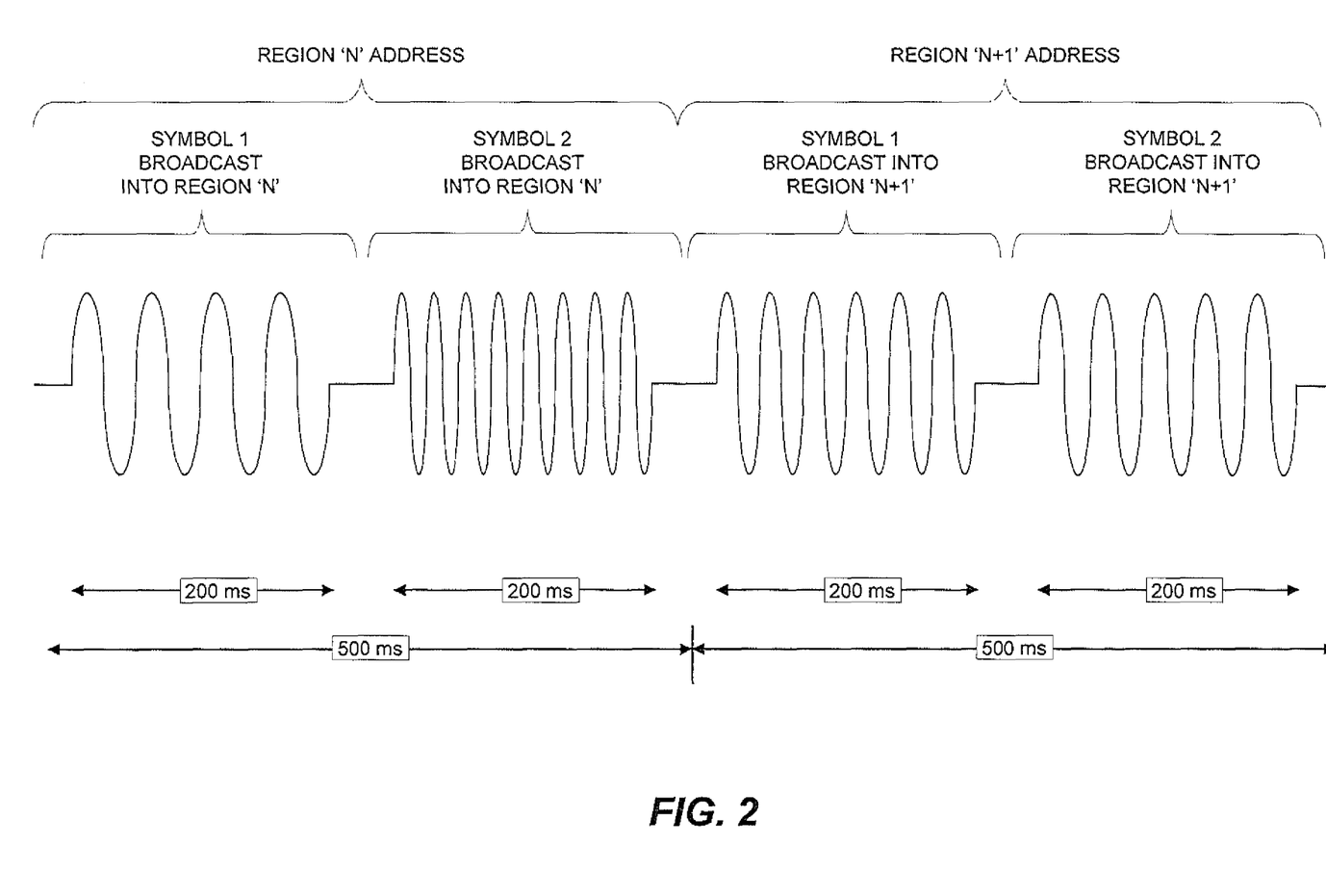
FIG. 2 is a graphical representation of an ultrasonic burst, in accordance with the present invention.

As shown in FIG. 2, each sequential tone consists of a one or more frequency components to represent one symbol. This figure shows a single frequency component for each symbol for simplicity, however it should be noted that each symbol will most likely consist of two simultaneous tones at different frequencies. Using dual tones to represent symbols provides a larger number of possible addresses that can be generated from a fixed set of frequencies to choose from. The number of tones and symbols can be adjusted to provide only one unique address for each emitter in the environment. For example, a large environment may require more tones and symbols to provide more usable addresses and a small environment may require fewer tones and symbols to provide fewer usable addresses. In the present invention, ultrasonic signals are typically provided from an emitter broadcasting a two-symbol burst duration of 500 milliseconds or less. Therefore, it is envisioned that each symbol has a duration of about 200 ms.

In accordance with the present invention, an emitter is fixed in a known location in the environment and is configured to provide an ultrasonic burst covering only a limited defined region of the environment. The processor of the mobile device is operable to discern the particular frequencies of the unique set of frequency tones received in its microphone signal, which is then used to identify the pre-defined region of the emitter that transmitted those specific tones, and subsequently the device that detected those specific tones. In practice it has been determined that one emitter in a typical retail environment can provide a coverage area of about sixteen feet square. Therefore, a location of a mobile device can be determined in an environment with a two-dimensional positional accuracy of about plus-or-minus eight feet. It is possible to obtain even finer location resolution when taking into account the relative amplitudes of the symbols received from adjacent regions. If, for example, the mobile device detects equal amplitude symbols from adjacent regions we can conclude that the device is located somewhere on the boundary between those regions.

A plurality of emitters can be disposed to cover an entire environment, each emitter focused to cover its own limited defined region, and each assigned its own distinctive set of tones as its unique regional address by the backend controller. In this way, a location of a mobile device can be determined throughout the environment by the mobile device detecting different sets of tones as it moves through different regions. In this scenario, the mobile device 100 could determine its own location if it knows the tones and locations of each emitter. Alternatively, the mobile device can transmit the tones it detects over the communication network 120 to a backend controller 130 that can determine the location of the mobile device based which tones it receives and a known floor plan of the emitter locations. It should be recognized that the particular tones and addresses of the ultrasonic emitter devices could be changed during operation. Choosing which tones to use can be coordinated by a backend controller 130 of the locationing system, which can communicate over the communication network 120 to direct each emitter 110 to emit the same specific tone set periodically.

In the example above, each emitter covers an area of sixteen feet square. Therefore, if a plurality of emitters 110 are used to completely cover an indoor environment, then these emitters must be spaced in a grid about sixteen feet apart. Mounting so many emitters on a ceiling of an environment can be challenging and expensive.

Figure 3:
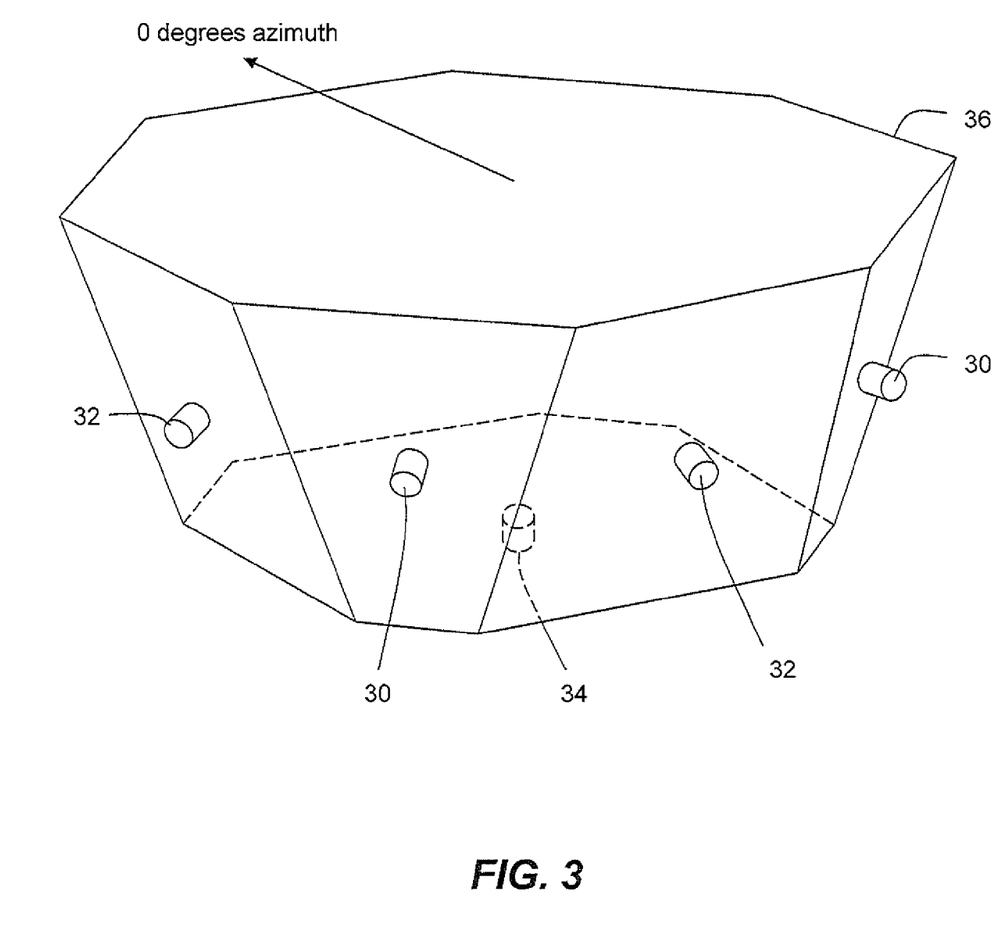
FIG. 3 is a perspective view of an ultrasonic emitter housing, in accordance with the present invention.

Therefore, in one embodiment, as shown in FIG. 3, there can be up to nine emitters (each of the configuration 116 of FIG. 1) integrated within a single emitter housing 36, and under the control of one controller (112 of FIG. 1). In this embodiment, eight regularly-spaced outwardly-firing emitters 30, 32 (only four shown to simplify the drawing) can be disposed around a periphery of the housing pointing outward and downward, and the ninth emitter 34 is disposed on the bottom of the housing 36, pointing downward. Each emitter is oriented in different directions and at different angles to cover adjacent regions with little overlap. In this way, instead of having one emitter that covers one region and being installing every sixteen feet, one housing can be installed every fifty feet by having the housing include nine emitters each focused on nine adjacent regions of sixteen feet square each.

For unobtrusiveness and clear signaling, the housing 36 can be affixed to a ceiling of the environment, where the position and coverage area of each emitter is known and fixed. Of course, it should be recognized than many different housing and emitter configurations could be utilized with any number of emitters. However, the embodiment described herein utilizes relatively closely-spaced, narrowly-focused emitter signals from a singular housing, where the focusing of each emitter is confined to a limited region.

Figure 4:
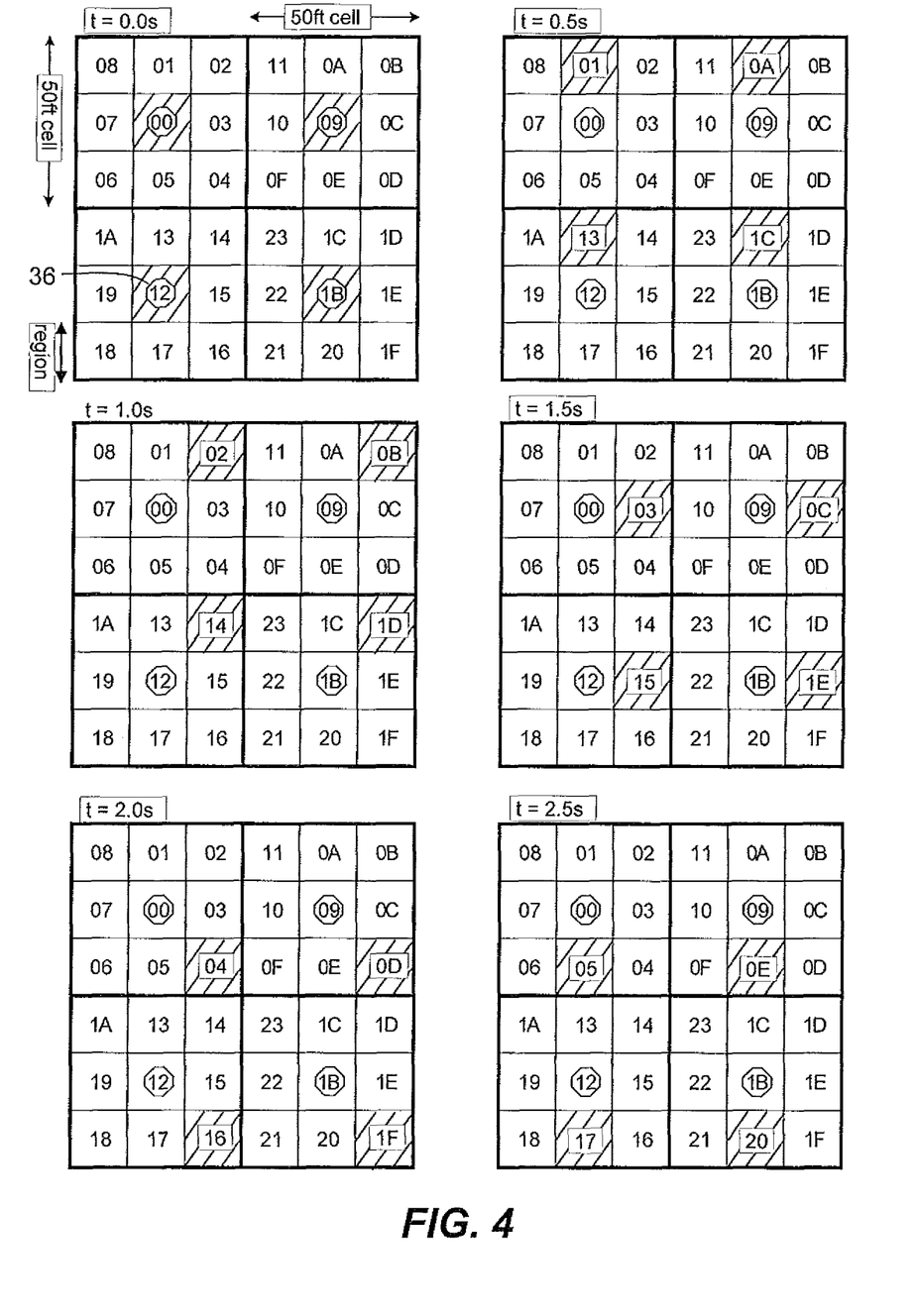
FIG. 4 is a graphical representation of tone coding covering regions of an indoor environment, in accordance with one embodiment of the present invention.
Figure 5:
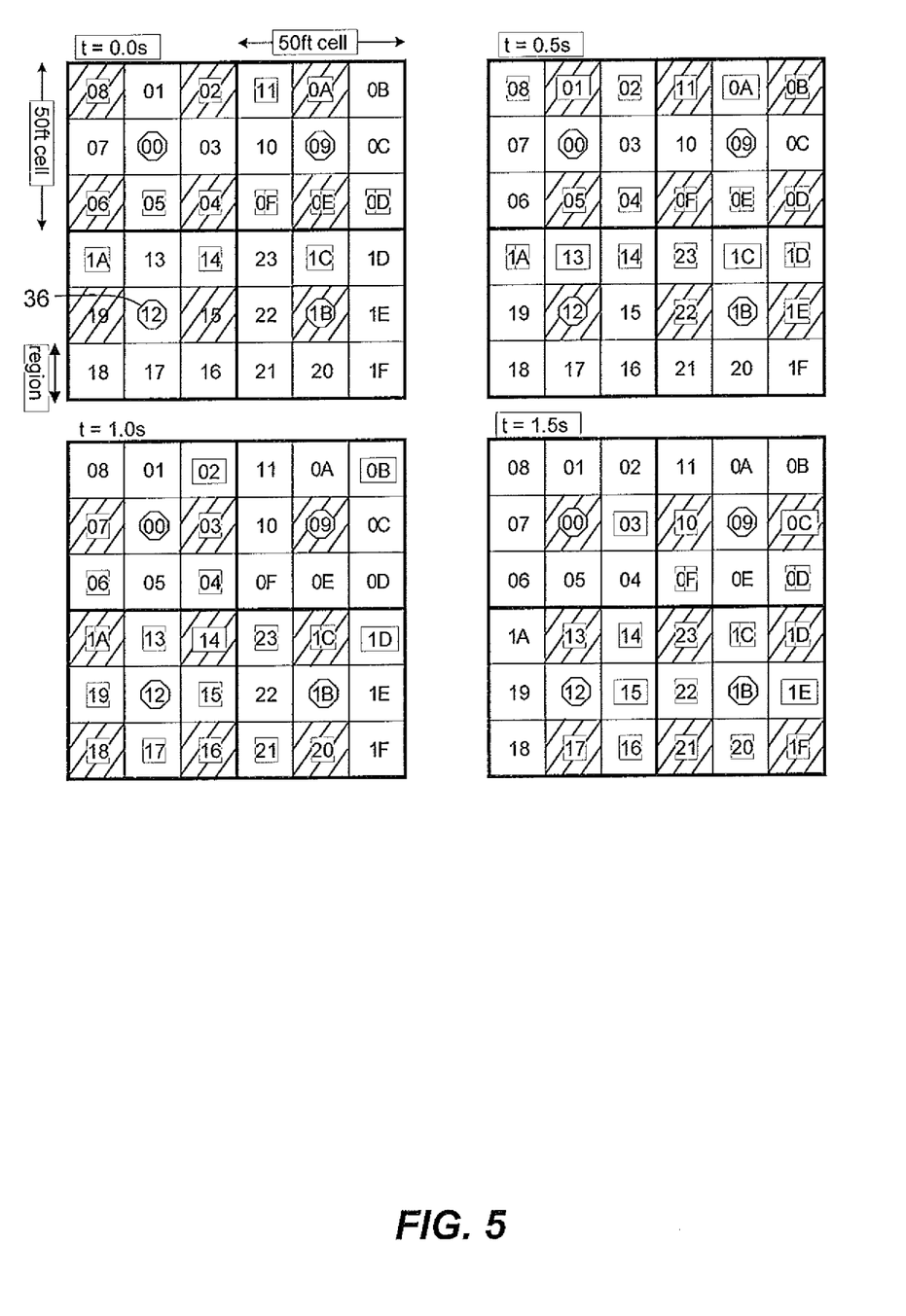
FIG. 5 is a graphical representation of tone coding covering regions of an indoor environment, in accordance with another embodiment of the present invention.

In practice, and referring to FIGS. 3-5, the indoor environment can be divided up into "cells" with each cell being centered on an ultrasonic housing with a plurality of emitters as in FIG. 3. Each cell is sub-divided into different regions each covered by one emitter, with each region being assigned an identifier address which is unique to the entire indoor environment. The present invention divides each fifty-foot cell into nine regions of about sixteen-foot square, but it should be recognized that the number and sizes of cells and regions could easily be reduced if less resolution and higher update rates are needed or increased if higher resolution with lower updates rates are needed.

Each housing 36 can consist of nine emitters, each directed toward a particular region in each cell. The current embodiment assumes eight emitters 30, 32 are regularly-spaced and oriented around an octagonal shape with one additional emitter 34 pointed directly down. The emitters should have a directional beam pattern output so as not to overlap too much into adjoining regions.

The azimuth and elevation angle of each emitter beam and the output power of each ultrasonic tone can be different and is configured to give maximal coverage in the region it is assigned to without driving excessive power into its respective region. For example, the first emitter 34 is pointed directly down to cover the region in the center of the cell and can have the weakest output power because it is traveling the shortest distance to the floor. The emitters 32 oriented at 0, 90, 180, and 270 degrees azimuth will have the appropriate elevation angle necessary to maximize coverage of the area formed in the regions assuming fifty foot spacing on the cells and some ceiling height. These emitters will require a moderate signal strength as they must cover those regions at the mid-points of the edges of the cell and must travel a further distance to the floor. The emitters 30 oriented at 45, 135, 225, and 315 degrees azimuth will have the appropriate elevation angle necessary to maximize coverage of the area formed in their regions assuming fifty foot spacing on the cells and some ceiling height. These emitters will require the strongest signal strength as they must cover those regions at the corners of the cell and must travel the furthest distance to the floor. Accordingly, the emitter signal strengths are configured to provide the same signal strength at the floor for each emitter.

Each of these ultrasonic emitters will broadcast a set of tones that are unique for its region of coverage. In particular, each region of each cell will be assigned a specific set of tones as an identifier. For example, the emitter pointing towards the upper left corner of the first cell can broadcast a unique symbol pair with the hexadecimal identifier "08" where each symbol of the pair consist of two tones. Each cell can alternate the local regions it transmits into in unison with all the other cells such that the same emitter orientation with respect to its local cell and housing will broadcast at the same time. For example, each housing 36 can fire its downwardly facing emitter 34 at the same time. This will ensure that adjacent cells will not be transmitting into adjacent regions, which could lead to possible interference. Accordingly, the present invention provides that emitters in neighboring regions do not emit their ultrasonic burst at the same time, and emitters in non-neighboring regions emit their ultrasonic burst at the same time.

It is envisioned that the processor of the mobile device will use a Fast Fourier Transform (FFT) to discern the tones in a burst in the frequency domain. As such, the present invention utilizes different tones in each symbol. However, the present invention operates within a limited frequency range of 20-22.05 kHz. Due to Doppler shifts that can occur with a mobile device, the amount of discernable frequency tones that can be accurately recognized within this range is limited.

In the ultrasonic band of interest (20 kHz to 22.05 kHz), it is possible to distinguish a total of M=8 distinct tones while still leaving room for as much as +/−125 Hz of Doppler shift (more than enough margin to accommodate that which would be present from a very fast walking speed). In a system that uses tone pairs to create each symbol, let M be the total number of frequencies in use, and let N be the total number of possible values each symbol can take on, i.e. $N=(M/2)^2$. The sequence that is transmitted into each region should consist of some number of symbols, K. This will result in a total number of $N^K$ possible region addresses. In a system that uses a two frequency tones to indicate a symbol it is possible to choose one of four low frequency tones and one of four high frequency tone as shown in Table 1 for each symbol in order to better discern the frequencies in the mobile device DSP FFT processing.

TABLE 1

Matrix of Frequency Tones

| | 21.05 kHz | 21.30 kHz | 21.55 kHz | 21.80 kHz |
| --- | --- | --- | --- | --- |
| 20.05 kHz | 0x0 | 0x1 | 0x2 | 0x3 |
| 20.30 kHz | 0x4 | 0x5 | 0x6 | 0x7 |
| 20.55 kHz | 0x8 | 0x9 | 0xA | 0x8 |
| 20.80 kHz | 0xC | 0xD | 0xE | 0xF |

In this arrangement, each of the dual frequency tones represents a hexadecimal symbol entry with N=16 different possible values. If two symbols (K=2) are transmitted in series to provide an address, this can address up to 256 different region locations. Or if more addresses are needed, three dual frequency tones can be transmitted in series to address up to 4096 region locations. The series of tones for each region can easily be detected by the processor of the mobile device using a simple Goertzel algorithm or other FFT algorithm programmed to find frequencies of interest. Once the tones are decoded into their respective symbol addresses, the location of the mobile device will be known due to the unique address.

Each frequency tone in the ultrasonic burst should last on the order of 200 ms in duration. This will give time to ensure that the sound has "filled" the region of interest even if a direct line of sight is not available, and will allow the FFT processing to collect enough samples to provide a definitive tone identification. If 50 ms of dead time is allowed between the tones, a total of 500 ms can be budgeted to transmit two symbols in an address of each region of each cell. To cover all regions, incrementing symbols (e.g. "00", "01", "02" . . . ) would be sent out to the respective adjacent regions of any one particular cell, as shown in FIG. 4. Under this model (assuming nine regions per cell), every mobile device can be located in an arbitrarily large environment every 4.5 seconds, i.e. nine regions per cell with one region covered every 500 ms. FIG. 4 shows how the regional addresses of any one particular cell can be incremented every 500 ms to cover each region (only six durations shown). After nine durations totaling 4.5 seconds (nine times 500 ms) the symbol sequence can be repeated, which can operate continuously.

In particular, FIG. 4 shows a four-cell floor space at six different time sequences 500 ms apart, i.e. t=0.0, 0.5, 1.0, 1.5, 2.0, 2.5 seconds. The cross-hatched areas of the figure show the regions that are actively emitting at various times. At each different time only one emitter in each cell is active. At time 0.0 s, the first region symbol address "00" is broadcast in the first cell, with the other three cell housings simultaneously broadcasting their own unique symbol address using the same respective emitter/region orientation in their cell, i.e. "09", "12", "1B". During a next time sequence after 500 ms (t=0.5 s), the next sequential region symbol address "01" is broadcast in the first cell, with the other three cell housings simultaneously broadcasting a unique symbol address using the same respective emitter/region orientation in their cell, i.e. "0A", "13", "1C". Although only six sequences are shown, it should be recognized that there are nine total sequences in order to cover all nine regions in each cell, totally 4.5 seconds, afterwhich the sequence is restarted again at t=0.0 s and repeated continuously.

It should also be noticed that no two adjacent regions are active at the same time, and only non-adjacent regions are active at the same time. In particular, in the example of FIG. 4, there are always two non-active buffer regions between active regions mitigating any interference issues. In addition, this embodiment provides control simplicity in that each housing in each cell can be directed to fire the same relative oriented emitter at the same time.

In an optional embodiment shown in FIG. 5, only one non-active buffer region is between active regions. This embodiment has the advantage of covering all regions in the environment every 2.0 seconds, i.e. locating all mobile devices every 2.0 seconds. However, this embodiment requires separate control of all emitters. For example, a different relative emitter in each housing of each cell can be firing at the same time, which requires more advanced control logic than the embodiment of FIG. 4. Also, this embodiment has a smaller buffer between active zones, which could lead to increased interference.

Once the location information of a device is known, this location information can be used by the backend controller to supply specific information related to that location to the mobile device, such as information about products in that location, for example. In addition, the backend controller can push an interactive customer application to the mobile device relating to products in that location. Additional information such as the relative amplitude of the tones, the Doppler shift of the tones, and inertial navigation could be used to further improve the locationing accuracy or provide an optional motion vector for the mobile device.

Figure 6:
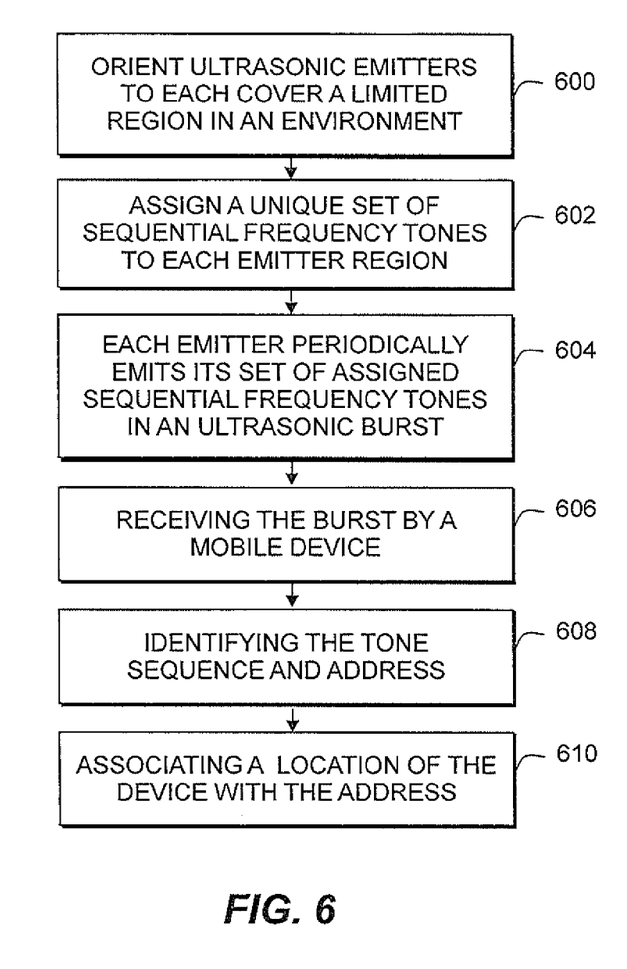
FIG. 6 is a flow diagram illustrating a method for ultrasonic locationing, in accordance with the present invention.

FIG. 6 is a diagram illustrating a method of ultrasonic locationing of a mobile device within an environment, according to some embodiments of the present invention.

A first step 600 includes orienting a plurality ultrasonic emitters within the environment such that an ultrasonic burst broadcast from each emitter is able to be detected by the mobile device within a limited region of the environment associated with that emitter. In this step, the signals emitted by each emitter in their respective region do not significantly overlap with those of adjacent regions. Preferably, multiple emitters are contained in one housing to improve installation, maintenance, and control hardware costs. It is envisioned that the housing for the emitters are affixed to a ceiling of the environment and oriented towards a floor of the environment. Specifically, multiple emitters are contained within one housing affixed to a ceiling of the environment, with the emitters oriented at different elevations.

A next step 602 includes assigning sets of unique sequential ultrasonic frequency tones for respective emitters in the environment such that the tones define a unique regional address for each emitter region in the environment. In one embodiment, two tones define a symbol and two symbols define the regional address in each ultrasonic burst. It one embodiment, the assigned tones are between 20 kHz and 22.05 kHz.

A next step 604 includes emitting by each emitter its set of assigned sequential frequency tones in one ultrasonic burst periodically. To avoid interference, emitters in neighboring regions do not emit their ultrasonic burst at the same time. Only emitters in non-neighboring regions emit their ultrasonic burst at the same time. In particular, a buffer zone of one or two non-emitting regions is used between actively emitting regions. The emitter signal strengths are configured to provide the same signal strength at the floor for each emitter.

A next step 606 includes receiving the set of sequential frequency tones by a mobile device. In particular, the mobile device utilizes existing audio circuitry for this step.

A next step 608 includes identifying the tones and their sequence in the ultrasonic burst as a regional address.

A next step 610 includes associating a location of the mobile device with the regional address.

Advantageously, the present invention provides an ultrasonic locationing system using a receiver running an audio codec running at a sample rate of 44.1 kHz, and audio microphone, and a digital signal processor, all of which are present in nearly every smart phone that is manufactured today. The present invention can be implemented using this existing hardware and a software app which could be downloaded and installed to use the existing hardware in the novel way described herein. The processing power to identify the regional address of the phone location is minimal. There are no elaborate calculations or search algorithms used to attempt to calculate an exact position with marginally accurate data such as Doppler. The present invention can yield a location estimate even when there is no line of sight to the ultrasonic receiver, a case that will be very common.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of ultrasonic locationing of a mobile device within an environment, the method comprising the steps of:
   distributing a plurality of ultrasonic housings that are spaced apart from each other within the environment and orienting a plurality ultrasonic emitters in each of the ultrasonic housings within the environment such that an ultrasonic burst broadcast from each emitter is able to be detected by the mobile device within an orientationally limited region of the environment associated with that emitter and limited by the orientation of that emitter;
   assigning sets of unique sequential ultrasonic frequency tones for respective emitters in the environment such that the tones define a unique regional address for the orientationally limited region associated with each emitter;
   emitting by each emitter its set of assigned sequential frequency tones in one ultrasonic burst periodically;
   receiving the set of sequential frequency tones by a mobile device;
   identifying the tones and their sequence in the ultrasonic burst as a regional address; and
   determining a location of the mobile device base on the orientationally limited region associated with the regional address.

2. The method of claim 1, wherein in the orienting step the regions do not significantly overlap.

3. The method of claim 1, where in the orienting step the emitters are affixed to a ceiling of the environment and oriented towards a floor of the environment.

4. The method of claim 1, where in the assigning step two tones define a symbol and two symbols define the regional address in each ultrasonic burst.

5. The method of claim 1, where in the emitting step emitters in neighboring regions do not emit their ultrasonic burst at the same time.

6. The method of claim 1, where in the emitting step sets of emitters in non-neighboring regions emit their ultrasonic burst at the same time.

7. The method of claim 1, where in the assigning step the assigned tones are between 20 kHz and 22.05 kHz and the mobile device utilizes existing audio circuitry for the receiving step.

8. The method of claim 1, where in the orienting step multiple emitters are contained within one housing affixed to a ceiling of the environment, with the emitters oriented at different elevations, and where in the emitting step the emitter signal strengths are configured to provide the same signal strength at the floor for each emitter.

9. An ultrasonic locationing system, comprising:
   a plurality of ultrasonic housings that are spaced apart from each other, wherein each ultrasonic housing includes a plurality of ultrasonic emitters disposed therein and oriented within an environment such that an ultrasonic burst broadcast from each emitter is able to be detected by a mobile device within an orientationally limited region of the environment associated with that emitter and limited by the orientation of that emitter, each emitter operable to emit at least two unique sequential ultrasonic frequency tones in one ultrasonic burst periodically;

a controller operable to assign sets of unique sequential ultrasonic frequency tones for respective emitters in the environment such that the tones define a unique regional address for the orientationally limited region associated with each emitter; and a mobile device operable to receive the set of sequential frequency tones and identify the tones and their sequence in the ultrasonic burst as a regional address, and configured to determine a location of the mobile device base on the orientationally limited region associated with the regional address.

10. The system of claim 9, wherein the regions do not significantly overlap.

11. The system of claim 9, wherein the emitters are affixed to a ceiling of the environment and oriented towards a floor of the environment.

12. The system of claim 9, wherein two tones define a symbol and two symbols define the regional address in each ultrasonic burst.

13. The system of claim 9, wherein emitters in neighboring regions do not emit their ultrasonic burst at the same time, and emitters in non-neighboring regions emit their ultrasonic burst at the same time.

14. The system of claim 9, wherein the assigned tones are between 20 kHz and 22.05 kHz and the mobile device utilizes existing audio circuitry for the receiving step.

15. The system of claim 9, wherein multiple emitters are contained within one housing affixed to a ceiling of the environment, with the emitters oriented at different elevations, and wherein the emitter signal strengths are configured to provide the same signal strength at the floor for each emitter.

16. The system of claim 9, wherein the location association is performed in one of the mobile device and the controller.

\* \* \* \* \*